(12) United States Patent
Meiri et al.

(10) Patent No.: US 8,838,849 B1
(45) Date of Patent: Sep. 16, 2014

(54) LINK SHARING FOR MULTIPLE REPLICATION MODES

(75) Inventors: David Meiri, Cambridge, MA (US); Dan Arnon, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 342 days.

(21) Appl. No.: 13/314,849

(22) Filed: Dec. 8, 2011

(51) Int. Cl.
*G06F 13/20* (2006.01)

(52) U.S. Cl.
USPC .............................. 710/29; 710/18; 711/162

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,581,713 A | 12/1996 | Myers et al. | |
| 5,754,800 A | 5/1998 | Lentz et al. | |
| 5,778,394 A | 7/1998 | Galtzur et al. | |
| 5,787,482 A | 7/1998 | Chen et al. | |
| 5,845,147 A | 12/1998 | Vishlitzky et al. | |
| 5,857,208 A | 1/1999 | Ofek | |
| 6,226,702 B1 | 5/2001 | Yakashiro et al. | |
| 6,286,083 B1 | 9/2001 | Chin et al. | |
| 6,343,351 B1 | 1/2002 | Lackman et al. | |
| 6,393,505 B1 | 5/2002 | Scalise et al. | |
| 6,505,265 B1 | 1/2003 | Ishikawa et al. | |
| 6,697,367 B1 | 2/2004 | Halstead et al. | |
| 6,731,944 B1 | 5/2004 | Ostrup et al. | |
| 6,747,976 B1 | 6/2004 | Bensaou et al. | |
| 6,944,726 B2 | 9/2005 | Yoder | |
| 7,240,129 B2 | 7/2007 | Hayden et al. | |
| 7,379,953 B2 | 5/2008 | Luo et al. | |
| 7,590,775 B2 * | 9/2009 | Gildfind et al. | 710/29 |
| 7,653,773 B2 * | 1/2010 | Larson et al. | 710/313 |
| 7,657,675 B1 * | 2/2010 | Hoffman et al. | 710/60 |
| 7,711,789 B1 * | 5/2010 | Jnagal et al. | 709/213 |
| 7,730,237 B1 | 6/2010 | Veprinsky et al. | |
| 7,751,407 B1 | 7/2010 | Don et al. | |
| 2007/0156955 A1 | 7/2007 | Royer et al. | |

OTHER PUBLICATIONS

U.S. Appl. No. 11/540,017, filed Sep. 29, 2006, Yochai et al.
Liu, C.L., et al., "Scheduling Algorithms for Multiprogramming in a Hard-Real-Time Environment," Association for Computing Machinery, Inc., 1973, pp. 1-15.
Chen, Ken, et al., "An Approximate Analysis of Waiting Time in Multi-Class M/G/1/./EDF Queues," Sigmetrics, 1996, pp. 190-199.

* cited by examiner

*Primary Examiner* — Gary Portka
(74) *Attorney, Agent, or Firm* — Muirhead and Saturnelli, LLC

(57) ABSTRACT

Sharing at least one link among a plurality of processes includes determining a capacity of the at least one link based on a number of I/O operations per unit time supported by the at least one link as a function of the amount of data provided by each of the I/O operations, determining a requirement of each of the processes based on user specifications and an amount of data provided by each I/O operation for each of the processes, and apportioning link capacity among the processes according to the requirement of each of the processes. In response to a sum of requirements for each of the processes being less than the capacity of the at least one link, additional link capacity may be provided to at least some of the processes.

20 Claims, 7 Drawing Sheets

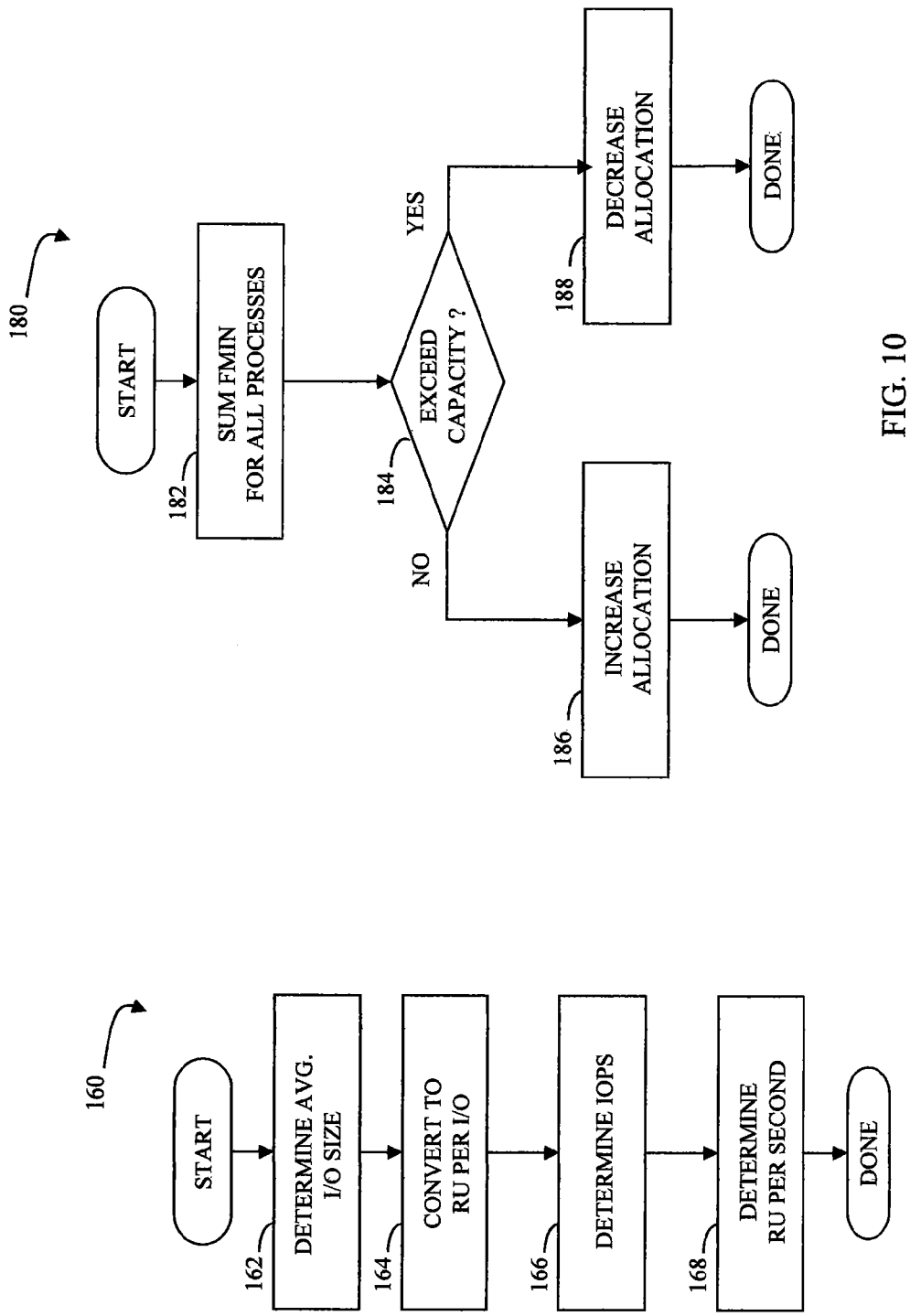

LINK SHARING FOR MULTIPLE REPLICATION MODES

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, data from a local storage device is replicated to a remote storage device via one or more replication links connecting the storage devices. In some cases, multiple processes at the local storage device may independently provide remote replication and thus may be sharing the one or more of the replication links. The processes may have different replication modes (e.g., synchronous, asynchronous, data mobility, etc.), with different quality of service requirements. However, it may be difficult to determine appropriate resource allocation between the different processes when the service requirements are not directly comparable (e.g., a specified lag time for a process that uses asynchronous replication vs. a specified response time for a process that uses synchronous replication). In addition, it may be difficult to estimate an effect on replication link capacity of each of the processes so that it is difficult to determine an appropriate amount of link capacity resources to allocate to each of the processes.

Accordingly, it is desirable to provide a mechanism that facilitates sharing a link among a plurality of processes that transmit data to a remote storage device where the link resources used by each of the processes may be determined irrespective of the mode used for replication.

SUMMARY OF THE INVENTION

According to the system described herein, sharing at least one link among a plurality of processes includes determining a capacity of the at least one link based on a number of I/O operations per unit time supported by the at least one link as a function of the amount of data provided by each of the I/O operations, determining a requirement of each of the processes based on user specifications and an amount of data provided by each I/O operation for each of the processes, and apportioning link capacity among the processes according to the requirement of each of the processes. In response to a sum of requirements for each of the processes being less than the capacity of the at least one link, additional link capacity may be provided to at least some of the processes. In response to a sum of requirements for each of the processes being greater than the capacity of the at least one link, link capacity for at least some of the processes may be decreased below user specifications provided therefor. For processes that provide synchronous data transfer, user specifications may be provided in terms of response time. Response time may be converted into resource units, where a resource unit corresponds to a transfer of a relatively small amount of data and where an amount of resource units for a process depends upon an average amount of data per I/O operation for the process. For processes that provide asynchronous data transfer, user specifications may be provided in terms of maximal lag that is converted into resource units. For processes that provide background copy data transfer, user specifications may be provided in terms of time to completion or bandwidth, which is converted into resource units. Sharing at least one link among a plurality of processes may also include determining a relationship between I/O block size and I/O time. The relationship may be linear. There may be more than one link.

According further to the system described herein, computer software, provided in a computer-readable medium, facilitates sharing at least one link among a plurality of processes. The software includes executable code that determines a capacity of the at least one link based on a number of I/O operations per unit time supported by the at least one link as a function of the amount of data provided by each of the I/O operations, executable code that determines a requirement of each of the processes based on user specifications and an amount of data provided by each I/O operation for each of the processes, and executable code that apportions link capacity among the processes according to the requirement of each of the processes. In response to a sum of requirements for each of the processes being less than the capacity of the at least one link, additional link capacity may be provided to at least some of the processes. In response to a sum of requirements for each of the processes being greater than the capacity of the at least one link, link capacity for at least some of the processes may be decreased below user specifications provided therefor. For processes that provide synchronous data transfer, user specifications may be provided in terms of response time. The software may also include executable code that converts response time into resource units, where a resource unit corresponds to a transfer of a relatively small amount of data and where an amount of resource units for a process depends upon an average amount of data per I/O operation for the process. For processes that provide asynchronous data transfer, user specifications may be provided in terms of maximal lag that is converted into resource units. For processes that provide background copy data transfer, user specifications may be provided in terms of time to completion or bandwidth, which is converted into resource units. The computer software may also include executable code that determines a relationship between I/O block size and I/O time. The relationship may be linear. There may be more than one link.

BRIEF DESCRIPTION OF DRAWINGS

FIG. 9 is a flow chart showing processing performed in connection with determining link capacity used by a process according to an embodiment of the system described herein.

FIG. 10 is a flow chart illustrating processing performed in connection with allocating link capacity to processes according to an embodiment of the system described herein.

DETAILED DESCRIPTION OF VARIOUS EMBODIMENTS

Figure 1:
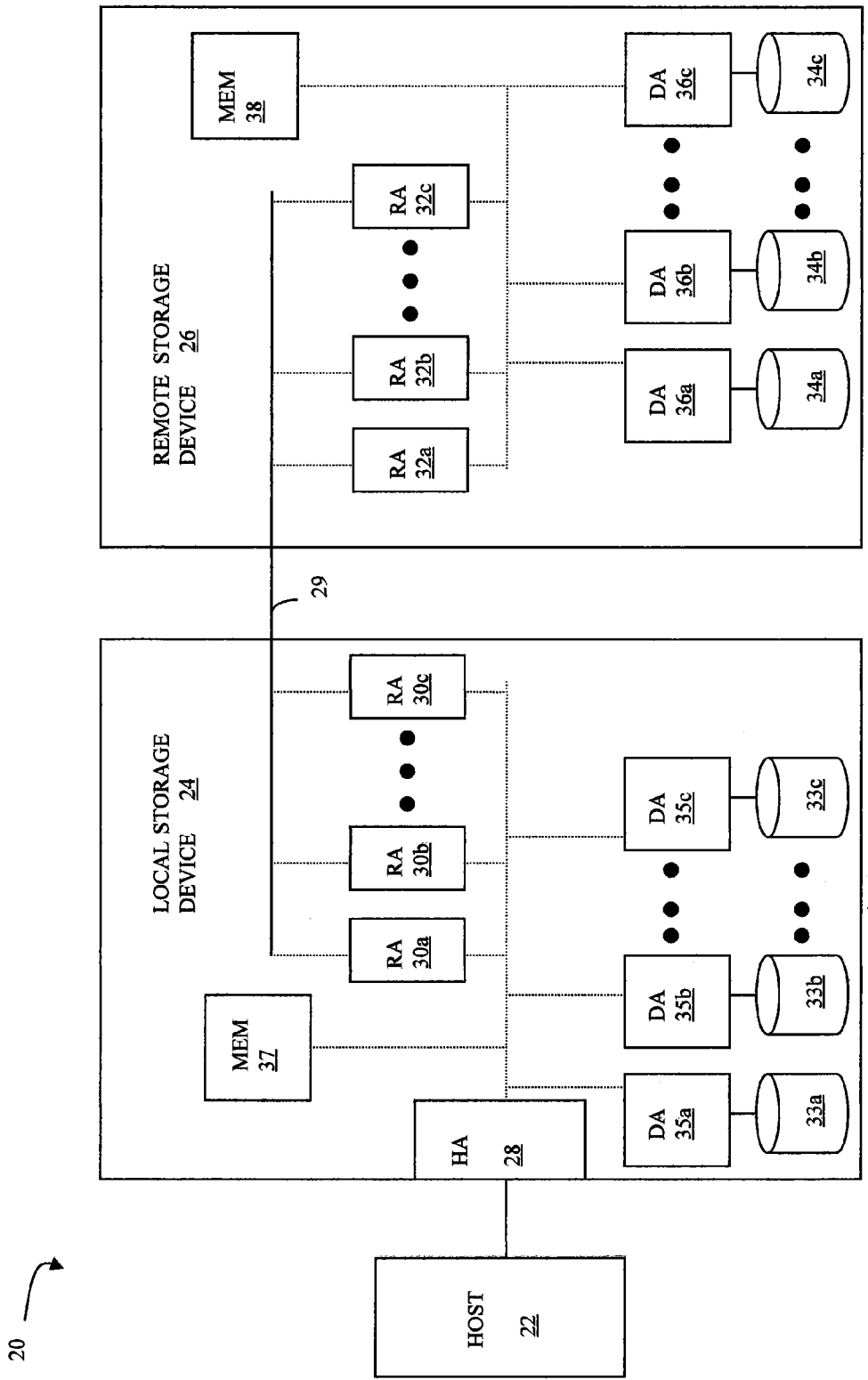
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via a link 29 to cause the data on the remote storage device 26 to be identical to the data on the local storage device 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere herein.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The remote data copying functionality described herein may be applied so that the data for at least a portion of the disks 33a-33c of the local storage device 24 is copied, using RDF or a different mechanism, to at least a portion of the disks 34a-34c of the remote storage device 26. It is possible that other data of the storage devices 24, 26 is not copied between the storage devices 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 may be used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing a mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the mapping causes modified data to be transferred from the local storage device 24 to the remote storage device 26 using the RA's, 30a-30c, 32a-32c and the link 29. In steady state operation, the logical device on the remote storage device 26 contains data that is identical to the data of the logical device on the local storage device 24. When the RDF mechanism is used, the logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
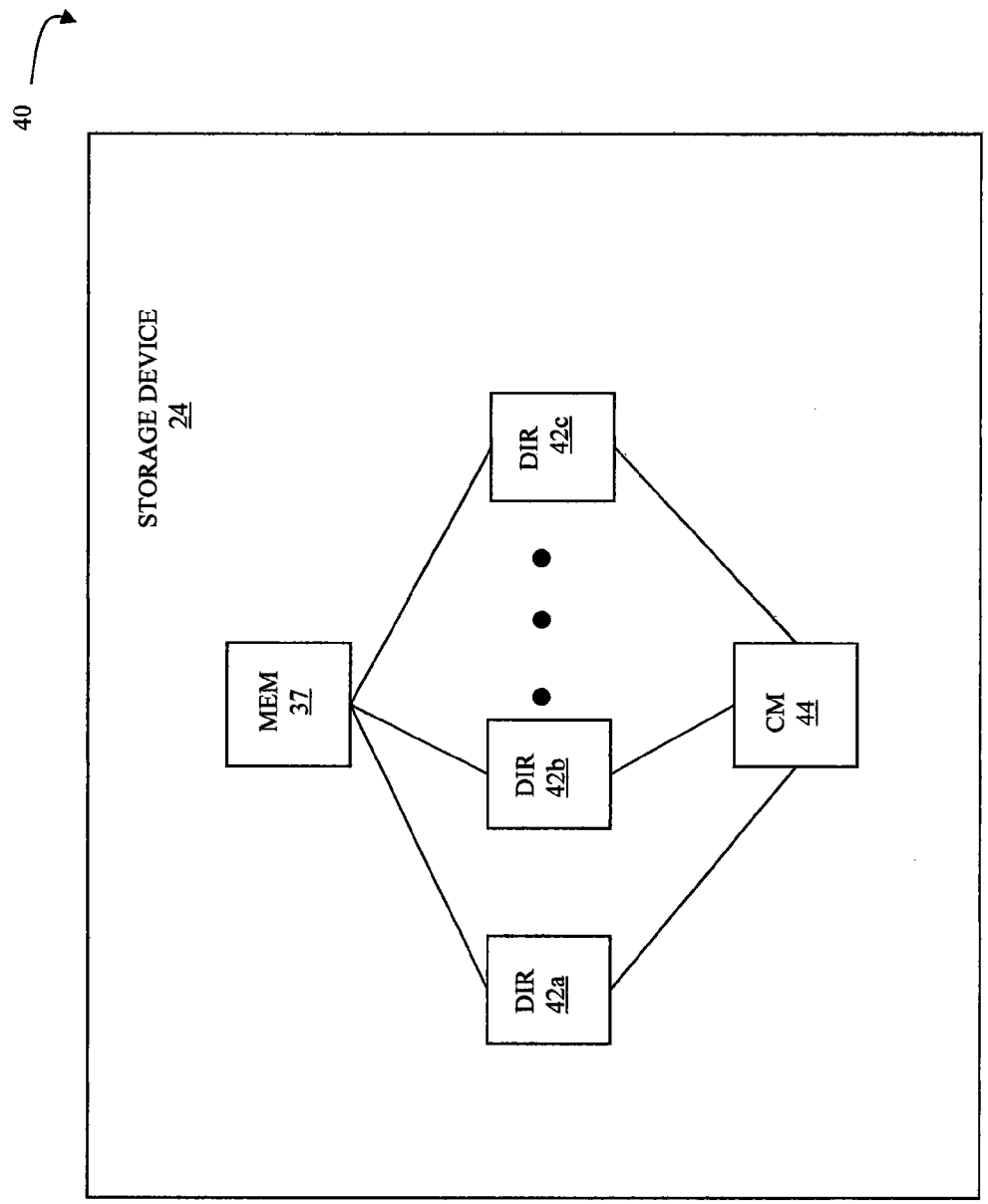
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
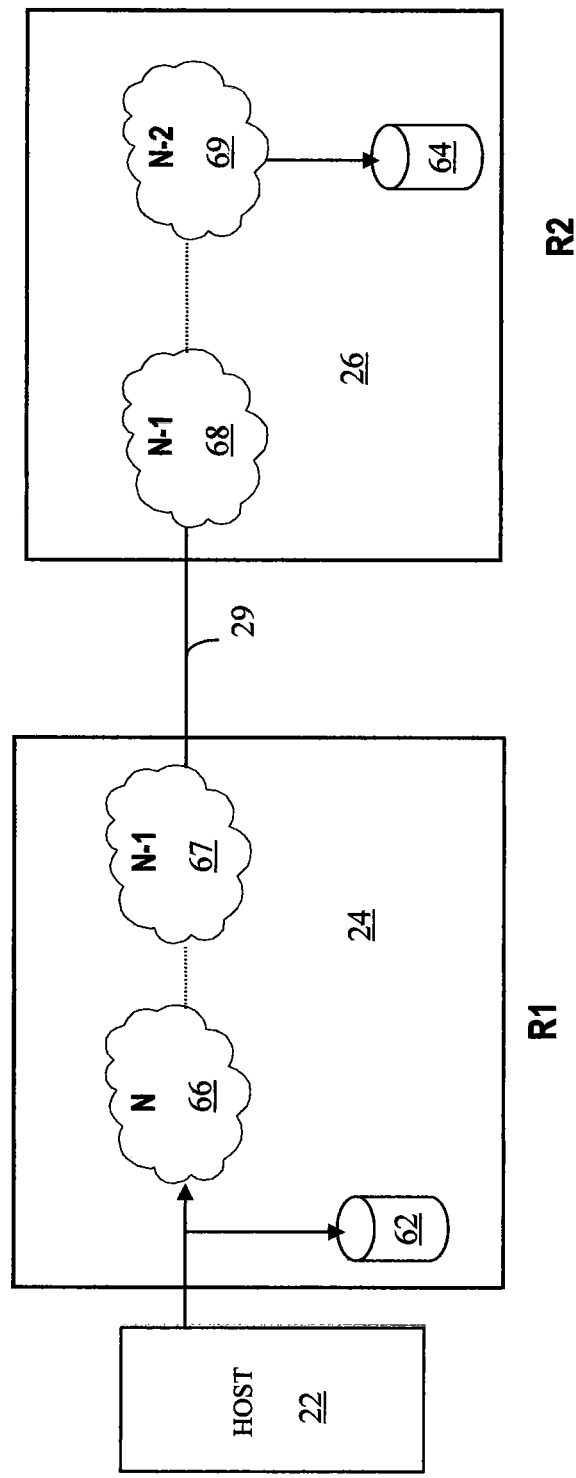
FIG. 3 is a schematic diagram showing a flow of data between a host, a local storage device, and a remote data storage device used in connection with an embodiment of the system described herein.

Referring to FIG. 3, a path of data is illustrated from the host 22 to the local storage device 24 and the remote storage device 26. Data written from the host 22 to the local storage device 24 is stored locally, as illustrated by the data element 62 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 3, the writes by the host 22 are shown as being assigned sequence number N. All of the writes performed by the host 22 that are assigned sequence number N are collected in a single chunk of data 66. The chunk 66 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 67 represents writes from the host 22 that were assigned the sequence number N−1 that have not been transmitted yet to the remote storage device 26.

The remote storage device 26 receives the data from the chunk 67 corresponding to writes assigned a sequence number N−1 and constructs a new chunk 68 of host writes having sequence number N−1. The data may be transmitted using appropriate RDF protocol that acknowledges data sent across the link 29. When the remote storage device 26 has received all of the data from the chunk 67, the local storage device 24 sends a commit message to the remote storage device 26 to commit all the data assigned the N−1 sequence number corresponding to the chunk 68. Generally, once a chunk corresponding to a particular sequence number is committed, that chunk may be written (destaged) to the logical storage device. This is illustrated in FIG. 3 with a chunk 69 corresponding to writes assigned sequence number N−2 (i.e., two before the current sequence number being used in connection with writes by the host 22 to the local storage device 24).

In FIG. 3, the chunk 69 is shown as being written (destaged) to a data element 64 representing disk storage for the remote storage device 26. Thus, the remote storage device 26 is receiving and accumulating the chunk 68 corresponding to sequence number N−1 while the chunk 69 corresponding to the previous sequence number (N−2) is being written to disk storage of the remote storage device 26 illustrated by the data element 64. In some embodiments, the data for the chunk 69 is marked for write (but not necessarily written immediately), while the data for the chunk 68 is not.

Thus, in operation, the host 22 writes, to the local storage device 24, data that is stored locally in the data element 62 and accumulated in the chunk 66. Once all of the data for a particular sequence number has been accumulated, the sequence number is incremented. Data from the chunk 67 corresponding to one less than the current sequence number is transferred from the local storage device 24 to the remote storage device 26 via the link 29. The chunk 69 corresponds to data for a sequence number that was committed by the local storage device 24 sending a message to the remote storage device 26. Data from the chunk 69 is written (destaged) to disk storage of the remote storage device 26.

Note that the writes within a particular one of the chunks 66-69 are not necessarily ordered. However, every write for the chunk 69 corresponding to sequence number N−2 was begun prior to beginning any of the writes for the chunks 67, 68 corresponding to sequence number N−1. In addition, every write for the chunks 67, 68 corresponding to sequence number N−1 was begun prior to beginning any of the writes for the chunk 66 corresponding to sequence number N. Thus, in the event of a communication failure between the local storage device 24 and the remote storage device 26, the remote storage device 26 may simply finish writing (destaging) the last committed chunk of data (the chunk 69 in the example of FIG. 3) and can be assured that the state of the data at the remote storage device 26 is ordered in the sense that the data element 64 contains all of the writes that were begun prior to a certain point in time and contains no writes that were begun after that point in time. Thus, R2 always contains a point in time copy of R1 and it is possible to reestablish a consistent image from the R2 device.

Figure 4:
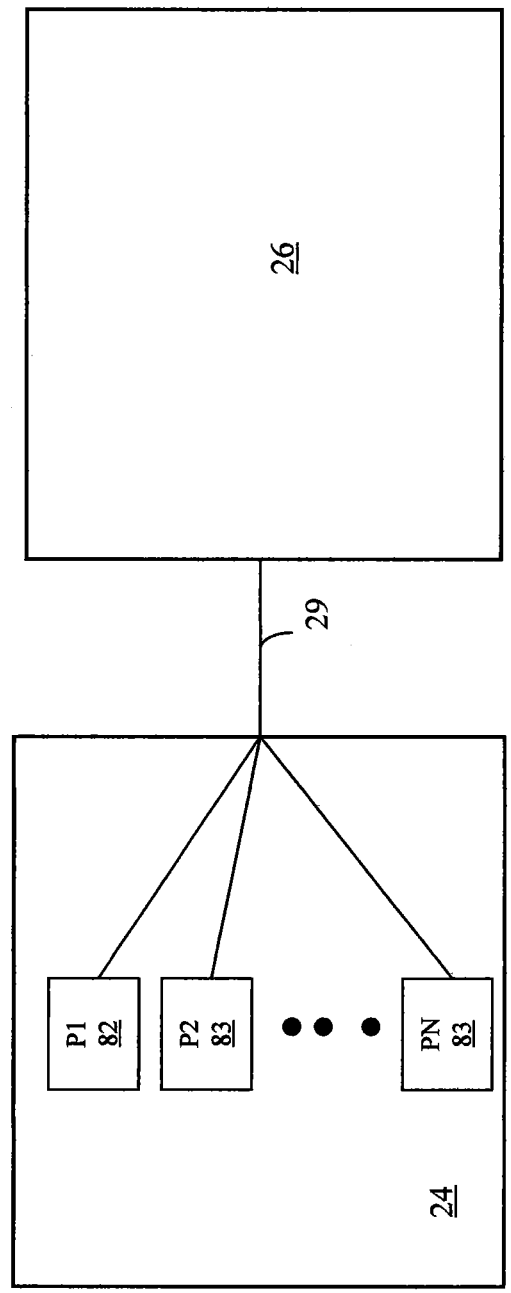
FIG. 4 is a schematic diagram showing a local storage device having a plurality of processes that share a link for transmitting data to a remote storage device according to an embodiment of the system described herein.

Referring to FIG. 4, the local storage device 24 is shown as including a plurality of processes 82-84. Although only three processes are shown in FIG. 4, the processes 82-84 are meant to represent any number of processes. Each of the processes 82-84 may provide data to the remote storage device 26 using the link 29 and one of a variety of data copying mechanisms (e.g., SRDF/S, SRDF/A, DM, etc.).

It is desirable to be able to allocate resources to each of the processes 82-84 that share the link 29 so that each of the processes 82-84 can meet a desired minimum requirement for throughput/response time. In the event that the sum of the minimum requirements exceeds the capacity of the link 29, it is desirable to allocate resources to the processes 82-84 in a way that is consistent with policies associated with each of the processes 82-84. Conversely, if the sum of the minimum requirements is less than the capacity of the link 29, it may be desirable to make additional resources available to each of the processes 82-84, again, consistent with policies associated with each of the processes.

Figure 5:
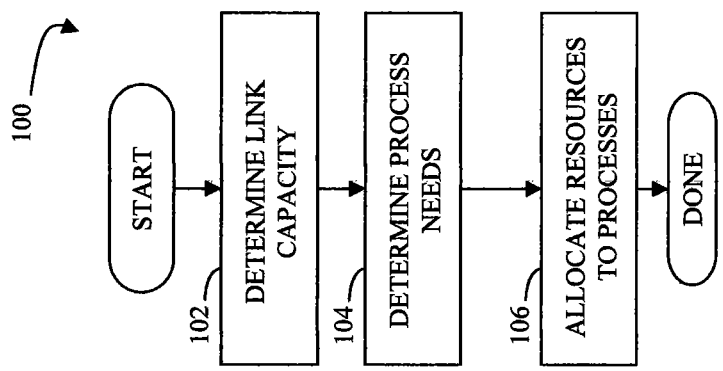
FIG. 5 is a flow chart illustrating steps performed in connection with a plurality of processes transmitting data to a remote storage device via a link according to an embodiment of the system described herein.

Referring to FIG. 5, a flow chart 100 illustrates steps for managing and allocating link resources among a plurality of processes that share a link. Processing begins at a first step 102 where a capacity of the link (total resources available) is determined. Determining the capacity of the link at the step 102 is discussed in more detail elsewhere herein. Note, however, that the capacity of the link may not be static, but may depend on factors such as the quality of a data connection, throughput at a remote site, etc. Thus, it may be useful to periodically reassess link capacity, and make adjustments, as appropriate.

Following the step 102 is a step 104 where the minimum link resource requirements is determined for each of the processes that share the link. The processing provided at the step 104 is discussed in more detail elsewhere herein. Following the step 104 is a step 106 where resources are allocated to processes. The allocation provided at the step 106 depends upon the results provided by the previous steps 102, 104. The processing provided at the step 106 is described in more detail elsewhere herein. Following the step 106, processing is complete.

The capacity of a link may be a function of the bandwidth of the link and the overhead associated with each I/O operation. I/O operations with larger block sizes (more data) are often more efficient than I/O operations with smaller block sizes. Accordingly, the number of I/O operations per unit time for a link depends upon the amount of data provided with each I/O operation. The system described herein takes this into account, as described in more detail elsewhere herein.

Figure 6:
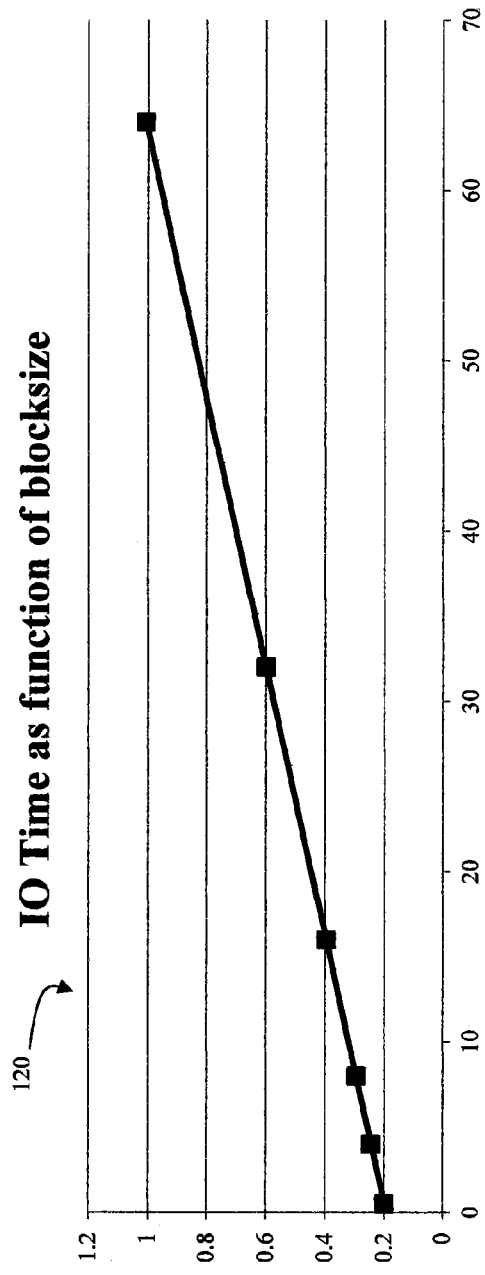
FIG. 6 is a chart showing transmission time as a function of block size according to an embodiment of the system described herein.

Referring to FIG. 6, a chart 120 shows I/O time as a function of block size (amount of data). The horizontal axis represents block size (in kilobytes) and the vertical axis represents the time it takes to perform an I/O operation (in milliseconds). Note that, as expected, an I/O operation for a larger block size takes longer than an I/O operation for a smaller block size. Note also that an I/O operation for a block containing zero kb (or an amount close to zero, such as 0.5 kb) takes a finite amount of time (0.2 ms) and that the relationship between block size and the time it takes to perform an I/O operation is linear. Thus, for example, the link corresponding to the chart 120 may perform five thousand I/O operations per second when the block size is zero (0.2 ms for each I/O operation), but may perform only one thousand I/O operations per second when the block size is sixty-four kb (1.0 ms per I/O operation).

Note that the linear relationship illustrated in FIG. 6 is an observed phenomenon and that other relationships are possible. Generally, it is possible to determine a relationship between I/O time and block size and provide a corresponding chart like the chart 120 of FIG. 6.

For the system described herein, the term "resource unit" (RU) corresponds to a zero kb I/O operation. Thus, the capacity of the link illustrated by the chart 120 is five thousand RUs per second. Since a sixty-four kb I/O operation takes one ms, then each sixty-four kb I/O operation uses five RUs and the link supports up to one thousand sixty-four kb I/O operations per second (five thousands RUs per second divided by five RUs per sixty-four kb I/O operation).

Figure 7:
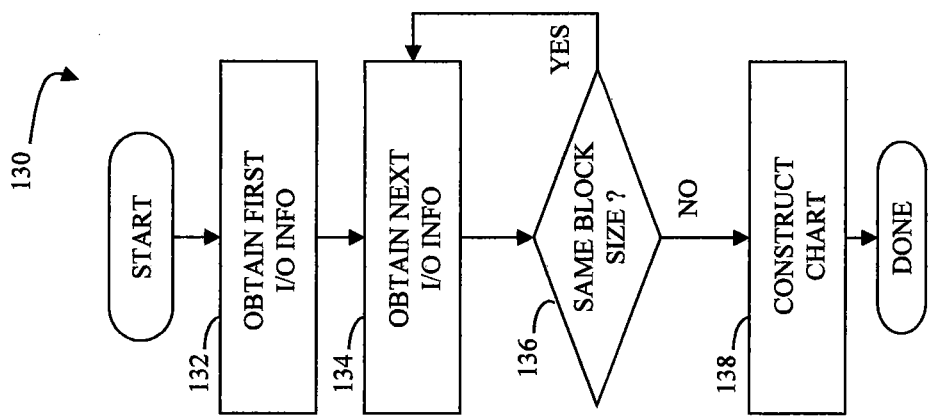
FIG. 7 is a flow chart illustrating processing performed in connection constructing the chart of FIG. 6 according to an embodiment of the system described herein.

Referring to FIG. 7, a flow chart 130 illustrates in more detail processing performed in connection with determining link capacity at the step 102 of the flow chart 100 of FIG. 5. Processing begins at a first step 132 where information for a first I/O is obtained. The information that is obtained at the step 132 includes the I/O block size (amount of data) and the time it took to perform the I/O. Following the step 132 is a step 134 where information for the next I/O operation is obtained. The information obtained at the step 134 is the same type of information obtained at the step 132.

Following the step 134 is a test step 136 where it is determined if the next I/O observed at the step 134 has the same block size as the I/O observed at the step 132. Note that drawing the line of the chart 120 (discussed above) requires two different points having two different block sizes. Two separate I/O operations with the same block size represent the same point, and thus may not be acceptable for constructing the chart 120. Note that, in some embodiments, it is not sufficient to use only two data points even though it is expected that the graph will be linear. Using only two points may result in inaccuracies. In such cases, it may be appropriate to obtain and average a number of points at each block size value. Other appropriate techniques may be used, such as least squares linear approximation.

If it is determined at the test step 136 that the next I/O has the same block size as the first I/O, then control transfers from the test step 136 back to the step 134 where the next I/O is observed. Otherwise, control transfers from the test step 136 to a step 138 where a line function is determined using the first I/O and the next I/O (having different block sizes). Determining the line function at the step 138 is known (using, for example, the formula $y=mx+b$, where b is the y intercept and m is the slope). Following the step 138, processing is complete.

Figure 8:
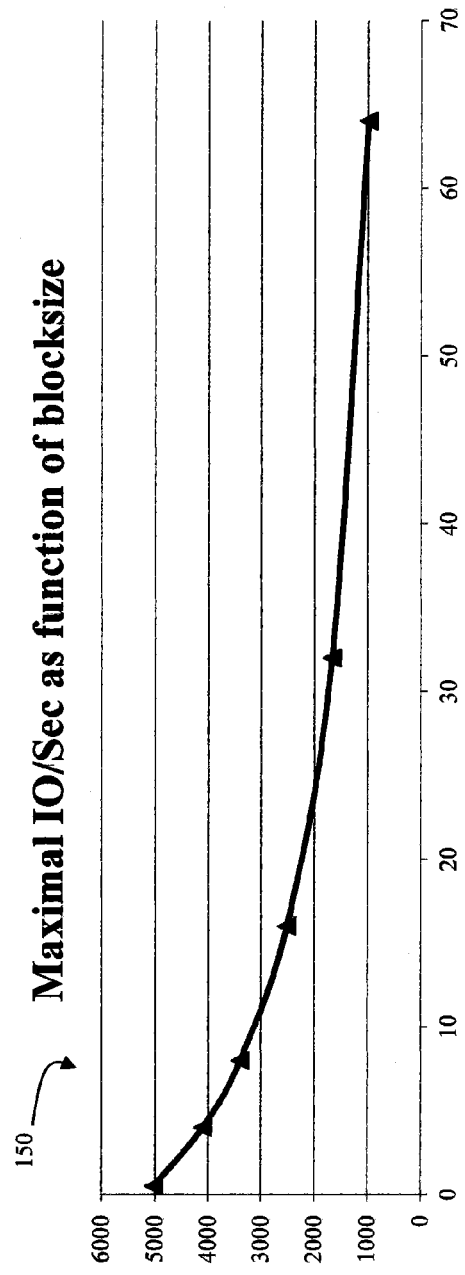
FIG. 8 is a chart showing I/O operations per second as a function of block size according to an embodiment of the system described herein.

Referring to FIG. 8, a chart 150 illustrates a relationship between block size and a maximum number of I/O operations per second (IOPS). The chart 150 may be constructed using the chart 120 of FIG. 6 where the IOPS value of the chart 150 is the inverse of the time value of the chart 120. Note that the chart 150 provides the number of TOPS as a function of block size where, for smaller blocks, it is possible to have more TOPS than for larger blocks. The chart 150 provides information that may be used at the step 102, discussed above, where the capacity of the link is determined. The number of TOPS for a zero kb I/O operation is five thousand. Thus, the capacity of the link is five thousand RUs per second.

Note also that it is possible to determine the number of RUs for an I/O operation of a particular block size by dividing five thousand (number of RUs for a block size of zero) by the maximum number of IOPS for that block size. Thus, if the maximum IOPS for a block size of sixty-four kb is one thousand, then each sixty-four kb operation uses five RUs, which is consistent with the discussion above where this was determined using the chart 120 of FIG. 6. Note also that once the chart is established, it is relatively easy to determine the number of RU's required to transfer data of any block size as well as the resulting response time.

Referring to FIG. 9, a flow chart 160 illustrates in more detail processing performed at the step 104 (discussed above) where a minimum link resource requirement for each of the processes that use the link is determined. Processing begins at a first step 162 where an average I/O block size is determined for a particular process using, for example, conventional techniques such as averaging. Following the step 162 is a step 164 where the average I/O block size is converted to the number of RUs per I/O operation, as discussed elsewhere herein. For example, if the average I/O operation is sixty-four kb, then, using the charts 120, 150 that are discussed above, each I/O operation uses five RUs.

Following the step 164 is a step 166 where the number of I/O operations per second for the process is determined (by, for example, observation/measurement). Following the step 166 is a step 168 where the minimum number of RUs per second for the process is determined by multiplying the number of IOPS by the RUs per I/O operation, both of which are determined in previous steps. Following the step 168, processing is complete.

In addition to the minimum number of RUs per second that may be determined for each of the processes, it is possible to specify a minimum link performance requirement for one or more of the processes. In some cases, a user may pay for, and thus expect, a particular minimum performance. Note, however, that a user may not necessarily specify the desired minimum performance in RUs but, instead, may use a different metric that may be converted to RUs, such as response time, lag time, bandwidth, etc. This is discussed in more detail below.

In the case of a synchronous transfer, a user may specify in average response time. Note that the response time is a function of the link performance in the case of a synchronous transfer, since a write to a local storage device is acknowledged after the data has been successfully transferred to, and acknowledged by, a remote storage device. If the link performance is relatively poor (slow), then the response time is relatively high. Conversely, if the link performance is relatively good (fast), then response time is relatively low.

In an embodiment herein, it may be assumed that the writes arrive at the local storage device in a Poisson distribution so that the well-known M/M/1 queuing model applies. Thus, assuming that a response time of RT is desired, then fmin, the required proportion of total link capacity that the processes require, is given by the following:

$$fmin = (1/RT + \lambda)/\mu$$

where $\lambda$ equals the minimum RUs per second determined for the process given the actual number of I/O operations (see the flow chart 160 and the corresponding discussion) and $\mu$ equals the actual link capacity (in RUs per second, discussed above). The variable thin corresponds to a percentage of the total link capacity, $\mu$.

Note that, for different I/O arrival rate distributions, fmin may be determined differently for a process that uses the link for synchronous data transfer. For example, if the distribution is relatively flat (i.e., the expected arrival time is evenly distributed), then fmin may be set to $1/RT/\mu$.

In the case of asynchronous data transfer, note that there are many different mechanisms that may be used and thus there may be many ways for a user to specify performance. In an embodiment herein, asynchronous data transfer may be provided using SRDF/A, which provides consistent asynchronous data transfer as discussed above in connection with FIG. 3. Of course, the system described herein may work with other types of asynchronous data transfer.

In asynchronous mode, performance requirements may be provided in terms of a desired minimum lag between the local and remote devices. That is, a user may specify the maximum amount of time difference (lag time) between a dataset at the local device and a consistent, but previous, version of the dataset at the remote device.

Note that with SRDF/A, all the data received by a remote device for a particular cycle is temporary until the cycle has been completely transmitted and committed, and thus contributes to increasing the lag time. That is, sending I/O's for the cycle does not decrease the lag time until the last I/O for the cycle is received by the remote storage device and the cycle has been committed and stored on the remote storage device.

In an embodiment herein, a technique may be used to achieve a user-defined lag time of ML by a next cycle of resource recalculation, which occurs every N seconds. For SRDF/A, the current lag time, L, is the time it takes for two cycle switches, which is known and can be expressed in RUs. The host I/O throughput is $\lambda$, measured in RU/sec (see discussion above). The SRDF/A link receives $\mu$*fmin RU/sec link resources for the next N seconds (cycle time), so that the lag at the end of N seconds is:

$$L' = MAX(L + *\lambda *N - \mu *fmin*N, 0)$$

If the user goal is maximal lag of ML, then:

$$ML = L + \lambda *N - \mu *fmin*N, \text{ so that}$$

$$fmin = ((L - ML)/N + \lambda)/\mu$$

Note, by the way, that if L is less than ML (the current lag is already less than the desired lag), fmin may be set to zero.

Data Mobility provides an inconsistent background copy mode that can be used for a number of purposes, such as providing copying ahead of consistent replication (to narrow the lag between source and target, as in "pre-copy"), or copying static devices. In an embodiment herein, each I/O operation may be sixty-four kb. The desired requirement may be a certain minimal throughput in MB/sec, which may be converted to a number of sixty-four kb IO's/sec and thus to a particular number of RU/sec. Accordingly, the particular number of RUs/sec may correspond to fmin directly.

Alternatively, a user may specify that a certain batch copy job be completed by a certain time. In such a case, it may be useful to specify the goals accordingly as:

$$fmin = D/(\mu *T)$$

where D is the amount of data remaining to be copied (measured in resource units), and T is the amount of time remaining for the operation.

Once fmin is determined for each the processes that share the link, it is possible to allocate link resources to each of the processes. Note that fmin is expressed as a proportion of link resources.

Referring to FIG. 10, a flow chart 180 illustrates steps performed in connection with allocating link resources to a number of processes that share a link. Processing begins at a first step 182 to determine fsum, a sum of all fmin values for all processes that share the link. Following the step 182 is a test step 184 where it is determined if fsum exceeds the capacity of the link. In an embodiment herein, since each value of fmin is expressed as a percentage of link capacity, then the test at the step 184 determines if fsum exceeds one.

If it is determined at the test step 184 that the link capacity is not exceeded, then control transfers from the test step 184 to a step 186 where link resources to each of the processes is increased above fmin for each of the processes. Note that, in some instances that may be driven by explicit policy, the increase may be apportioned proportionally, so that, for each process, the amount of allocated resources is set to fmin/fsum. Note that fsum is less than one so fmin/fsum is greater than fmin. In other embodiments, the amount of allocated resources may be increased using different criteria. For example, it may be possible to take into account a priority assigned to each of the processes to increase the allocation of processes with a higher priority more than processes with a lower priority. It is also possible to favor processes that use a particular type of transfer over other processes (e.g., provide a proportionally greater increase to processes that use synchronous transfers over other processes). Following the step 186, processing is complete.

Note that, in some instances, a user may pay for link services according to an amount of allocated capacity so that a user may not desire to receive additional (unneeded) link capacity at a higher price. For such users, it may be possible to forego providing additional capacity at the step 186. Alternatively, a user may pay for fmin capacity and not be charged for additional capacity provided by the system described herein.

If it is determined at the test step 184 that the link capacity is exceeded (i.e., there is not enough capacity to service all of the minimum process requests), then control transfers from the test step 184 to a step 188 where link resources to each of the processes is decreased below fmin for each of the processes (or possibly only for some of the processes). In an embodiment herein, the decrease may be apportioned proportionally, so that, for each process, the amount of allocated resources is fmin/fsum. Note that, in this case, fsum is greater than one so that each of the processes is allocated less than fmin amount of link resources. In other embodiments, the amount of allocated resources may be decreased using different criteria. For example, it may be possible to take into account a priority assigned to each of the processes. It is also possible to favor processes that use a particular type of transfer over other processes (e.g., provide a proportionally lesser decrease to Processes that use synchronous transfers over other processes). Note, by the way, the using queuing theory and assuming a Poisson distribution for the arrival of writes that need to be transferred over the link, some processes could develop a significantly large backlog of data to be transferred. Thus, it may be advantageous not to decrease such processes. Following the step 188, processing is complete.

Note that enforcement of the allocated link resources may be provided using any appropriate mechanism. For example, it is possible to apportion a number of slots in a link transmit queue according to the allocated percentage of the link resources (e.g., a process allocated ten percent of the link resources receives twice as many slots in a link transit queue as another process that is allocated five percent of the link resources).

In some embodiments, there may be multiple links that are shared by a number of processes. In an embodiment herein, each of the links is assumed to have the same or nearly the same throughput capacity as each of the other links. Thus, the total throughput capacity from the local storage device to the remote storage device is N*C, where N is the number of links and C is the capacity of one of the links. In addition, in the case of a process using synchronous transfer mode, any one of a number of multiple links may be used. For asynchronous transfers and/or for data mobility transfers, it may be possible to evenly divide the work among the links to minimize the lag time (time it takes to transmit data). In some embodiments, when the capacities of various links vary, the total capacity (N*C) may be replaced by the sum of the individual capacities of the links.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of sharing at least one link among a plurality of processes, comprising:
   determining a capacity of the at least one link based on a number of I/O operations per unit time supported by the at least one link as a function of the amount of data provided by each of the I/O operations;
   determining a requirement of each of the processes based on user specifications and the amount of data provided by each I/O operation for each of the processes;
   determining an average amount of data per I/O operation for each of the processes;

determining resource units in connection with the I/O operations for each of the processes, wherein each of the resource units corresponds to a transfer of a same specified amount of data, and wherein an amount of the resource units for a process depends upon the average amount of data per I/O operation for the process, and wherein each of the I/O operations corresponds to multiple resource units; and apportioning link capacity among the processes according to the requirement of each of the processes and based on the amount of the resource units determined according to the average amount of data per I/O operation for each of the processes.

2. The method according to claim 1, wherein, in response to a sum of requirements for each of the processes being less than the capacity of the at least one link, additional link capacity is provided to at least some of the processes.

3. The method according to claim 1, wherein, in response to a sum of requirements for each of the processes being greater than the capacity of the at least one link, link capacity for at least some of the processes is decreased below user specifications provided therefor.

4. The method according to claim 1, wherein, for processes that provide synchronous data transfer, user specifications are provided in terms of response time.

5. The method according to claim 4, wherein response time is converted into the resource units.

6. The method according to claim 1, wherein, for processes that provide asynchronous data transfer, user specifications are provided in terms of maximal lag that is converted into the resource units.

7. The method according to claim 6, wherein, for processes that provide background copy data transfer, user specifications are provided in terms of at least one of: time to completion and bandwidth, which is converted into the resource units.

8. The method according to claim 1, further comprising:
determining a relationship between I/O block size and I/O time.

9. The method according to claim 8, wherein the relationship is linear.

10. The method according to clam 1, wherein there is more than one link.

11. A non-transitory computer-readable medium storing software that facilitates sharing at least one link among a plurality of processes, the software comprising:
executable code that determines a capacity of the at least one link based on a number of I/O operations per unit time supported by the at least one link as a function of the amount of data provided by each of the I/O operations;
executable code that determines a requirement of each of the processes based on user specifications and an amount of data provided by each I/O operation for each of the processes;
executable code that determines an average amount of data per I/O operation for each of the processes;
executable code that determines resource units in connection with the I/O operations for each of the processes, wherein each of the resource units corresponds to a transfer of a same specified amount of data, and wherein an amount of the resource units for a process depends upon the average amount of data per I/O operation for the process, and wherein each of the I/O operations corresponds to multiple resource units; and
executable code that apportions link capacity among the processes according to the requirement of each of the processes and based on the amount of the resource units determined according to the average amount of data per I/O operation for each of the processes.

12. The non-transitory computer-readable medium according to claim 11, wherein, in response to a sum of requirements for each of the processes being less than the capacity of the at least one link, additional link capacity is provided to at least some of the processes.

13. The non-transitory computer-readable medium according to claim 11, wherein, in response to a sum of requirements for each of the processes being greater than the capacity of the at least one link, link capacity for at least some of the processes is decreased below user specifications provided therefor.

14. The non-transitory computer-readable medium according to claim 11, wherein, for processes that provide synchronous data transfer, user specifications are provided in terms of response time.

15. The non-transitory computer-readable medium according to claim 14, further comprising:
executable code that converts response time into the resource units.

16. The non-transitory computer-readable medium according to claim 11, wherein, for processes that provide asynchronous data transfer, user specifications are provided in terms of maximal lag that is converted into the resource units.

17. The non-transitory computer-readable medium according to claim 16, wherein, for processes that provide background copy data transfer, user specifications are provided in terms of at least one of: time to completion and bandwidth, which is converted into the resource units.

18. The non-transitory computer-readable medium according to claim 11, further comprising:
executable code that determines a relationship between I/O block size and I/O time.

19. The non-transitory computer-readable medium according to claim 18, wherein the relationship is linear.

20. The non-transitory computer-readable medium according to clam 11, wherein there is more than one link.

* * * * *